United States Patent [19]

Philby

[11] Patent Number: 4,655,983
[45] Date of Patent: Apr. 7, 1987

[54] PISTON RINGS AND THEIR MANUFACTURE

[75] Inventor: Jonathan D. Philby, Rugby, England

[73] Assignee: AE PLC, Warwickshire, England

[21] Appl. No.: 764,574

[22] Filed: Aug. 12, 1985

[30] Foreign Application Priority Data

Aug. 13, 1984 [GB] United Kingdom ............... 8420545

[51] Int. Cl.$^4$ .................... B28B 3/06; B23P 15/06
[52] U.S. Cl. .................. 264/297.1; 29/156.6;
29/DIG. 31; 277/215; 277/220; 277/193;
277/DIG. 6; 264/297.2; 264/DIG. 67; 419/66;
425/DIG. 42
[58] Field of Search .......... 29/156.6, 527.5, DIG. 31;
277/75, 192, 193, 194, 215, 216, 220, 221, DIG.
6; 419/1, 61, 66; 264/325, 328.1, 297.1, 297.2,
DIG. 67; 425/DIG. 42

[56] References Cited

U.S. PATENT DOCUMENTS

| 1,219,270 | 3/1917 | Dunham | 277/193 X |
|---|---|---|---|
| 1,857,254 | 5/1932 | Morton | 29/156.6 |
| 2,047,806 | 7/1936 | Swanson et al. | 277/193 X |
| 2,111,291 | 3/1938 | Mason | 277/193 |
| 2,918,340 | 12/1959 | Knoeble | . |
| 3,561,087 | 2/1971 | Koehler | 29/156.6 |
| 3,655,208 | 4/1972 | Walker | 29/156.6 X |
| 4,465,515 | 8/1984 | Mundorff | 29/156.6 X |
| 4,497,497 | 2/1985 | Berti | . |

FOREIGN PATENT DOCUMENTS

| 522616 | 4/1931 | Fed. Rep. of Germany | 277/193 |
|---|---|---|---|
| 834166 | 3/1952 | Fed. Rep. of Germany | . |
| 963482 | 5/1957 | Fed. Rep. of Germany | . |
| 706076 | 6/1931 | France | . |
| 855346 | 5/1940 | France | . |
| 240753 | 10/1925 | United Kingdom | . |
| 381179 | 9/1932 | United Kingdom | . |
| 412695 | 7/1934 | United Kingdom | 277/194 |
| 458497 | 9/1935 | United Kingdom | . |
| 439353 | 12/1935 | United Kingdom | . |
| 488155 | 7/1938 | United Kingdom | . |
| 1306963 | 2/1973 | United Kingdom | . |
| 1555011 | 11/1979 | United Kingdom | . |

Primary Examiner—Howard N. Goldberg
Assistant Examiner—Ronald S. Wallace
Attorney, Agent, or Firm—Leydig, Voit & Mayer

[57] ABSTRACT

A piston ring is formed by annular upper and lower parts which contact one another at respective surfaces normal to the axis of the piston ring. The parts can be injection moulded from thermoplastics materials with the parts themselves having no re-entrant portions, so allowing quick and easy manufacture, but with the parts together defining re-entrant portions such as a spring-receiving recess at the inward side of the ring or a pair of spaced oil control rails at the outward side of the ring.

3 Claims, 5 Drawing Figures

PISTON RINGS AND THEIR MANUFACTURE

BACKGROUND TO THE INVENTION

1. Field of the Invention

The invention relates to piston rings for internal combustion engines and to methods for their manufacture.

The purpose of a piston ring of an internal combustion engine is to span the gap between the piston in which the ring is mounted and the associated cylinder or liner in order, during piston reciprocation, to prevent combustion gases passing between the piston and the cylinder and/or to control the thickness of the oil film on the associated cylinder or liner. In its simplest form, piston rings are of generally rectangular cross-section with the longer sides extending radially. This shape can be quickly and easily produced by a variety of well known methods.

2. Brief Review of the Prior Art

However, benefits have been shown to arise from the use of shaped piston rings. For example, it can be of benefit to provide one or two radially outwardly projecting rails on a piston ring, where the ring is controlling the thickness of the oil film on the associated cylinder or liner. Further, it has been found beneficial to provide a positive radially outward force acting on the ring in order to urge it towards the associated cylinder or liner and for this purpose annular springs have been provided acting on the radially inner surfaces of piston rings. For this purpose, it has been proposed to provide an annular recess extending around the piston ring in order to provide positive location of the spring on the piston ring.

These more complex shapes are more difficult to manufacture than the simple ring of rectangular cross-section. Many of the known techniques cannot be used. The most common method of producing such rings is by a moulding operation; for example a sintering and moulding operation, where the piston ring is of metal, or a hot pressing technique where the ring is of a thermosetting plastics material or an injection moulding process, where the ring is of a thermoplastic. However, moulding has the disadvantage that certain shapes can only be produced using complex equipment. For example, where re-entrant surfaces are required, it is necessary to use collapsible cores and this adds to the time, expense and cost of producing a piston ring. Such re-entrants may, for example, be found in the gaps between a pair of outwardly projecting rails or in a recess for a spring.

SUMMARY OF THE INVENTION

According to a first aspect of the invention, there is provided a piston ring for an internal combustion engine comprising an upper generally annular part having spaced ends defining therebetween a gap, said annulus defining an axis, a surface provided on said upper generally annular part and lying in a plane normal to said axis of said upper generally annular part, a lower generally annular part having spaced ends defining therebetween a gap, said annulus defining an axis, a surface provided on said lower generally annular part and lying in a plane normal to said axis of said lower generally annular part, said surface of said upper generally annular part and said surface of said lower generally annular part contacting one another to form together said piston ring.

The two parts of the piston can be simple in shape and so can readily be formed by a moulding process. They can be such, however, that when they are placed together a piston ring of complex shape is produced.

According to a second aspect of the invention, there is provided a method of manufacturing a piston ring comprising forming a generally annular part having spaced ends defining therebetween a gap, said annulus defining an axis, providing on said upper annular part a surface provided on said upper generally annular part and lying in a plane normal to said axis of said upper generally annular part, forming a lower generally annular part having spaced ends defining therebetween a gap, said annulus defining an axis, providing on said lower annular part a surface provided on said lower generally annular part and lying in a plane normal to said axis of said lower generally annular part, placing said surface of said upper generally annular part and said surface of said lower generally annular part in contact with one another to form together a piston ring.

BRIEF DESCRIPTION OF THE DRAWINGS

The following is a more detailed description of some embodiments of the invention, by way of example, reference being made to the accompanying drawings in which.

DESCRIPTION OF THE PREFERRED EMBODIMENTS

Figure 1:
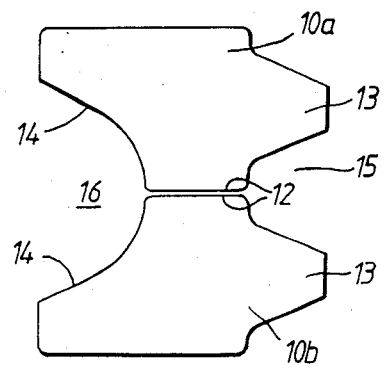
FIG. 1 is a cross-sectional view of a first form of piston ring formed by upper and lower annular parts manufactured by an injection moulding process.

Referring first to FIG. 1, the piston ring is formed of a tough crystalline thermoplastic material or an alloy thereof. An example of such a tough crystalline thermoplastic material is polyetheretherketone. This is a tough crystalline thermoplastic aromatic polyetherketone containing the repeating unit

and having an inherent viscosity of 0.7. The polyetheretherketone may be made by the polycondensation of hydroquinone and a 4-4'-dihalobenzophenone (a proportion of which is 4-4'-diflourobenzophenone) and an alkaline metal carbonate or bicarbonate, as described in European Patent Publication No. 0 001 879. The polyetheretherketone may be unreinforced or may be reinforced with carbon fibers which may be randomly arranged or may be orientated to extend, for example around the piston ring. In addition, bronze, graphite or polytetrafluoroethylene may be added to the polyetheretherketone either together or separately. For example, an alloy of the kind disclosed in British Patent Application No. 84.06547 may be used.

The piston ring is formed by upper and lower annular parts 10a, 10b which have the same configuration and include a surface 12 lying in a plane normal to the axis thereof. One of said parts is inverted relative to the other of said parts so that these surfaces 12 are in contact. Each part 10a, 10b includes an outward projection 13 of generally converging trapezoidal cross-section and disposed symmetrically about a median plane of the part normal to the axis thereof. Each part 10a, 10b also includes a concavely curved inner surface 14 whose maximum depth is at the associated contacting surface 12.

Thus, when one annular part is inverted relative to the other, and the two surfaces 12 are placed together, as shown in FIG. 1, the two projections form two annular oil control rails 13 on the finished piston ring with a re-entrant channel 15 between them. The two inner curve surfaces 14 form an annular recess 16 for receipt of an annular coil spring for urging the piston ring outwardly.

There is a gap (not shown) in each part 10a, 10b and the gaps are in or substantially in register.

The two parts 10a, 10b are formed by injection moulding. Since neither part has, in itself, any re-entrant portions, the injection moulding process can be performed quickly and rapidly without using collapsing dies. The re-entrant portions 15, 16 are only formed when the two parts 10a, 10b are placed together to form the complete piston ring. Thus a piston ring of complex shape can be formed cheaply and quickly.

Figure 2:
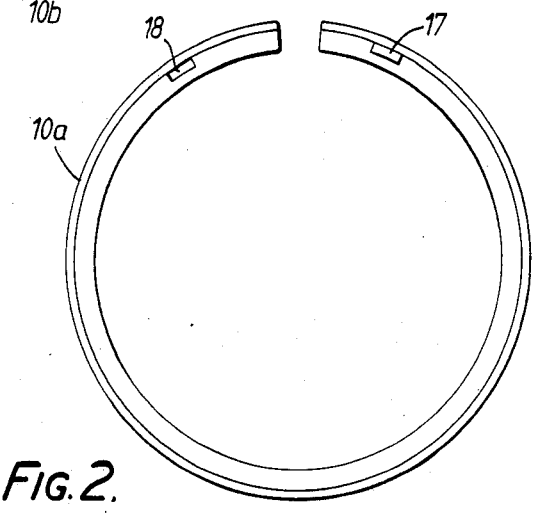
FIG. 2 is a plan view of one annular part of a piston ring formed by upper and lower such parts, and showing a locating peg and recess.
Figure 3:
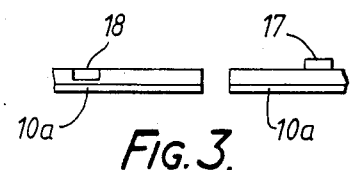
FIG. 3 is a partial view of the ends of the annular part shown in FIG. 2.

The two parts 10a, 10b may, as shown, be unconnected to allow relative movement therebetween. Alternatively, as shown in FIGS. 2 and 3, each part 10a, 10b may be provided with a peg 17 and a recess 18 adjacent the free ends thereof. Thus, when one part is inverted relative to the other, the peg 17 on one part engages in the recess 18 on the other part, in order to prevent relative angular movement between the parts.

Figure 4:
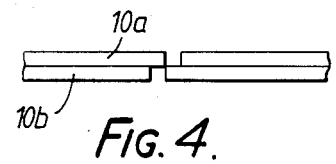
FIG. 4 is a partial side elevation of a third form of piston ring formed from upper and lower parts showing the upper part offset relatively to the lower part.

The pegs 17 and the recesses 18 need not be symmetrically disposed about the gap; they may be angularly displaced relative to the gap, as shown in FIG. 2, so that when the two parts are placed together, the upper ring 10a is angularly offset relative to the lower ring 10b. This is shown in FIG. 4.

Figure 5:
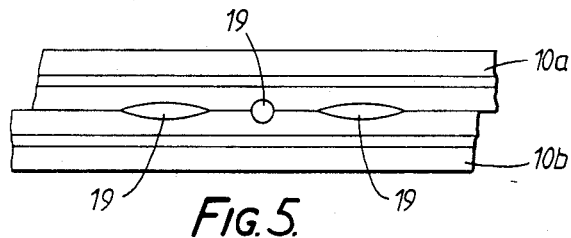
FIG. 5 is a partial elevation of a fourth form of piston ring formed from upper and lower parts and including slots of two different kinds extending through the piston ring.

It is a requirement in many piston rings, that slots or holes be provided in the ring to allow the drainage of oil through the ring. The piston ring method described above can be readily adapted to provide such a feature. As shown in FIG. 5, each annular part can be provided with one or more recesses 19 extending across the radial width of the associated part and in register with the recess or recesses 19 of the other part, when the two parts 10a, 10b are placed together. These recesses can form a slot of circular cross-section or a slot of oval cross-section, both forms being shown in FIG. 5. Thus, the cooperating recesses provide the required holes or slots extending radially through the piston ring.

It will be appreciated that the benefits of a two-part construction to piston rings are not confined to those piston rings having re-entrant portions. It may be found easier and cheaper to manufacture various other configurations of piston rings in two parts rather than in one.

In addition, materials other than thermoplastics may be used. For example, thermosetting plastics may be used in a hot pressing process. Further, metals may be used with the parts of the piston ring being formed by a sintering process in which a metal powder is sintered to shape in a suitable die.

I claim:

1. A method of manufacturing a piston ring from a plastics material, comprising:
    moulding from said plastics material an upper generally annular part having no re-entrants and spaced ends definining therebetween a gap, said annular part defining an axis,
    providing on said upper annular part in said moulding step a surface lying in a plane normal to said axis of said upper generally annular part,
    providing on said upper generally annular part in said moulding step, an outer surface which is inclined relatively to said axis,
    moulding from said plastics material a lower generally annular part having no re-entrants and spaced ends defining therebetween a gap, said lower annular part defining an axis,
    providing on said lower annular part in said moulding step a surface lying in a plane normal to said axis of said lower generally annular part,
    providing on said lower generally annular part in said moulding step, an outer surface which is inclined relatively to said axis,
    placing said surface of said upper generally annular part and said surface of said lower generally annular part in contact with one another to form together a piston ring, said inclined outer surface of the upper generally annular part and said inclined outer surface of the lower generally annular part forming together a re-entrant.

2. A method according to claim 1 and in which the moulding process is selected from the group of a hot pressing or an injection moulding process.

3. A method according to claim 1 and in which the annular parts are symmetrical about a plane normal to the piston axis and including said contacting surfaces, the method comprising forming two annular parts having a common configuration including a surface lying in a plane normal to the axis thereof and then inverting one of said parts relative to the other so that said surfaces are in contact to form the piston ring.

* * * * *